(12) United States Patent
Takahashi et al.

(10) Patent No.: US 6,421,176 B1
(45) Date of Patent: Jul. 16, 2002

(54) OPTICAL ISOLATOR

(75) Inventors: Tatsuo Takahashi, Machida; Toshiaki Masumoto, Sendai; Masayuki Kimura, Shiroishi, all of (JP)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 09/514,198

(22) Filed: Feb. 22, 2000

Related U.S. Application Data

(63) Continuation-in-part of application No. PCT/US99/21559, filed on Sep. 17, 1999.

(30) Foreign Application Priority Data

Sep. 18, 1998 (JP) ............................................. 10-264257

(51) Int. Cl.⁷ ................................................ G02B 5/30
(52) U.S. Cl. ..................... 359/484; 359/281; 359/282; 359/283; 359/485; 359/486; 359/487; 359/495; 359/496; 359/497; 372/703; 385/11; 385/33; 385/36; 428/212
(58) Field of Search ........................ 359/484, 495–497, 359/281–283, 487; 372/703; 385/11, 33, 36; 428/212; 350/375

(56) References Cited

U.S. PATENT DOCUMENTS

| | | | | |
|---|---|---|---|---|
| 4,392,722 A | * | 7/1983 | Shirasaki | 350/375 |
| 5,452,122 A | * | 9/1995 | Tsuneda et al. | 359/281 |
| 5,574,595 A | | 11/1996 | Kurata et al. | 359/484 |
| 5,848,203 A | * | 12/1998 | Kawakami et al. | 385/11 |
| 5,930,038 A | * | 7/1999 | Swan | 359/484 |
| 5,962,114 A | * | 10/1999 | Jonza et al. | 428/212 |

FOREIGN PATENT DOCUMENTS

| | | | | |
|---|---|---|---|---|
| GB | 2 173 607 A | 10/1986 | ............ | G02F/1/09 |
| JP | 5911315 | 7/1984 | ............ | G02B/27/28 |
| JP | 60184225 | 9/1985 | ............ | G02B/27/28 |
| WO | WO95/17691 | 6/1995 | ............ | G02B/5/30 |

* cited by examiner

Primary Examiner—Audrey Chang
Assistant Examiner—Craig Curtis
(74) Attorney, Agent, or Firm—Nestor F. Ho

(57) ABSTRACT

An optical isolator having a constitution in which a Faraday rotator is sandwiched by two polarizers, which can be more easily produced at a reduced cost. An optical isolator is constituted so that it comprises the following constituent elements in the described order: a first reflection-type polarizer made of a polymeric multilayer film; a Faraday rotator capable of rotating the polarizing plane by 45 degrees; a tapered glass plate; and a second reflection-type polarizer made of a polymeric multi-layer film.

4 Claims, 3 Drawing Sheets

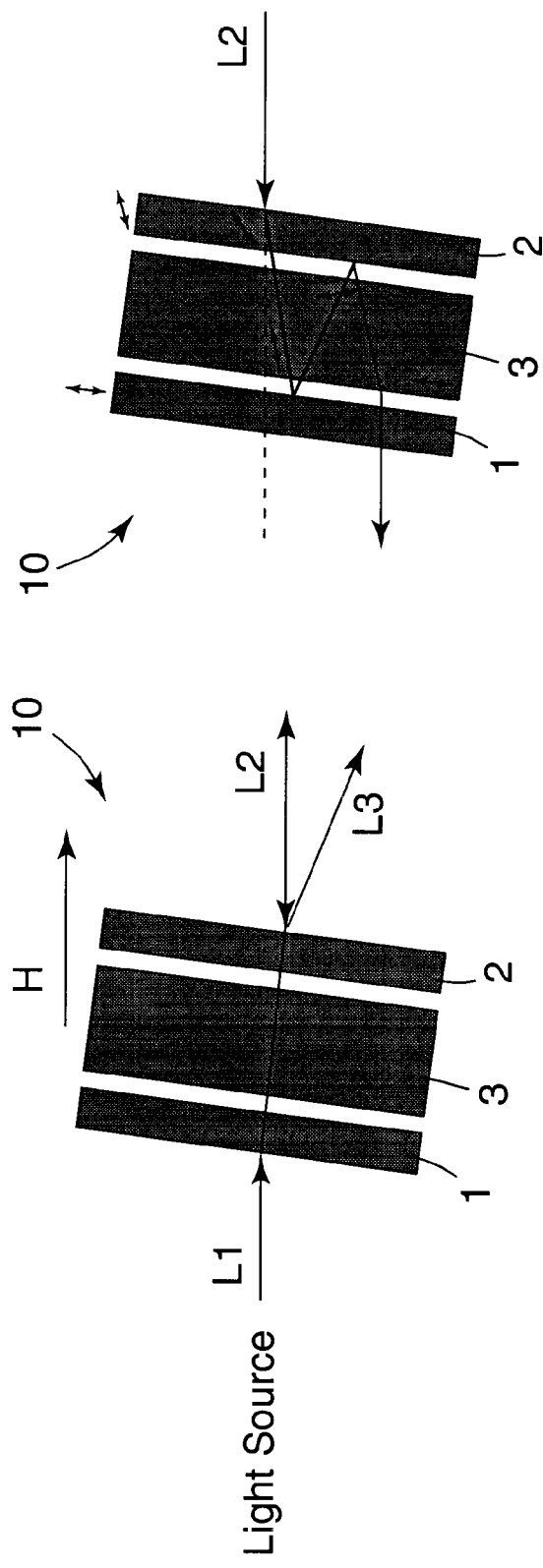

OPTICAL ISOLATOR

This application is a continuation-in-part of application PCT/US99/21559, filed Sep. 17, 1999.

BACKGROUND

The present invention relates to an optical circuit element and, more particularly, to an optical isolator which permits light to transmit in a predetermined direction only in an optical communication equipment, optical data equipment and similar equipment.

An optical isolator-typically comprises a Faraday rotator applied with a magnetic field capable of rotating the polarizing plane of incident light by 45 degrees, and two polarizers sandwiching the Faraday rotator from both sides, i.e., from the light incident side and from the light emerging side. Such an optical isolator exhibits a low loss in the forward direction in which light travels from the incident side to the emerging side, and exhibits a large loss in the reverse direction in which light returns from the emerging side back to the incident side. Thus, the optical isolator exhibits a function for transmitting light in one direction only, shutting off the transmission of light in the reverse direction.

Optical isolators of various types have heretofore been known. For instance, Japanese Examined Utility Model Publication (Kokoku) No. 7-17057 discloses an optical isolator constituted by a Faraday rotator which is a parallelepiped having an end surface on the incident side tilted relative to the optical axis and rotates, by 45 degrees, the polarizing plane of emerging light of a semiconductor laser, and a polarizing/isolating film formed on the end surface on the emerging side of the Faraday rotator. The polarizing/isolating film exhibits a polarizing/isolating property which permits the P waves to pass through but reflects the S waves, and can be formed by alternatingly laminating dielectric films having different refractive indexes and having a predetermined thickness one upon the other.

In the conventional optical isolators, the polarizer is made up of the polarizing/isolating film formed by laminating dielectric layers, as well as a polarized beam splitter, a polarizing glass, and a birefringent single crystal. However, these polarizers are all made from expensive starting materials, and require working steps such as cutting, polishing, etc., and are inevitably accompanied by complex production steps and increased production costs. In fact, the cost of producing the polarizer is about 50% of the total cost for manufacturing the conventional optical isolator. It has therefore been urged to lower the cost of producing the polarizer in the production of optical isolators.

One of the objects of the present invention is to provide an optical isolator which can be easily produced, while maintaining a good yield and a low cost, yet exhibiting an insertion loss and a reverse loss comparable to those of the conventional optical isolators.

SUMMARY OF THE INVENTION

In one embodiment thereof, the present invention relates to an optical isolator comprising the following elements in the described order:
- a first reflection-type polarizer made of a polymeric multilayer film;
- a Faraday rotator capable of rotating a polarizing plane by 45 degrees;
- a tapered glass plate; and
- a second reflection-type polarizer made of a polymeric multi-layer film.

In another embodiment thereof, the present invention resides in an optical isolator comprising the following constituent elements in the described order:
- a first reflection-type polarizer made of a polymeric multilayer film;
- a tapered Faraday rotator; and
- a second reflection-type polarizer made of a polymeric multi-layer film.

In these optical isolator embodiments of the present invention, the constituent elements are preferably joined and integrally secured together with an adhesive or similar joining means.

DESCRIPTION OF THE DRAWINGS

FIG. 5 is a sectional view illustrating the optical isolator according to a third embodiment of the present invention, with the paths of transmission light through the optical isolator.

FIG. 6 shows furthermore detailed paths of the light in the optical isolator describe in FIG. 5.

Figure 1:
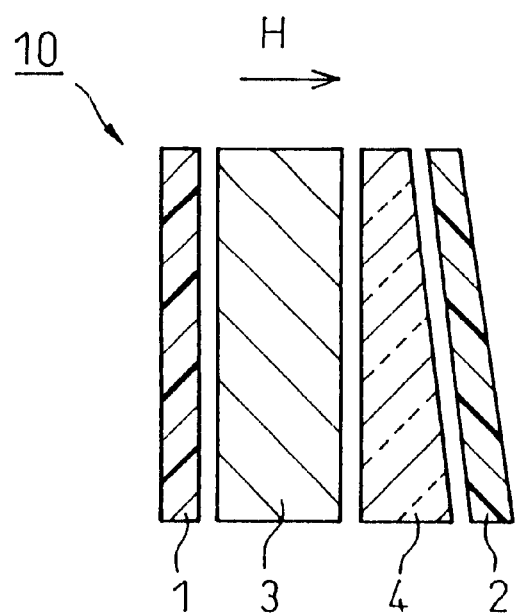
FIG. 1 is a sectional view illustrating an optical isolator according to a embodiment of the present invention.

Basically, the optical isolator according to the present invention has a constitution similar to that of the conventional optical isolator. That is, the optical isolator according to the present invention is constituted, at least, by a Faraday rotator capable of rotating the polarizing plane by 45 degrees, and two polarizers sandwiching the Faraday rotator from both sides, i.e., from the light incident side and from the light emerging side.

The two polarizers used in the optical isolator of the present invention are, respectively, the reflection-type or reflective polarizers made of a polymeric multi-layer film and are, preferably, used in the form of polarizing films. From the standpoint of distinction, the polarizer arranged on the light incident side is called first polarizer, and the polarizer arranged on the light emerging side is called second polarizer. In the following description, the polarizers of the present invention are particularly described with reference to the reflection-type polarizing film.

The reflection-type polarizing film that is preferably used for carrying out the present invention is a multi-layer optical film disclosed in Japanese Unexamined Patent Publication (Kokai) No. 9-507308. As described in the publication, this multi-layer film is obtained by alternatingly laminating two kinds of different polymers "A" and "B" one upon the other. That is, the obtained multi-layer film has a structure in which the layers are laminated in order of - - - A B A B - - - . This multi-layer film is drawn along an axis (X-axis) at a drawing ratio of about 5:1 but is not drawn along another axis (Y-axis at right angles with X-axis). Therefore, the multi-layer film is drawn along the Y-axis substantially at a drawing ratio of 1:1. In this specification, the X-axis is described as "drawing direction" and the Y-axis is described as "transverse direction".

In producing the above-mentioned multi-layer film, the one polymer "B" has an apparent refractive index (e.g., 1.64) which does not substantially change depending upon the drawing or, in other words, which is optically isotropic.

The other polymer "A" is the one of which the refractive index changes depending upon the drawing process. For example, the monoaxially drawn sheet of the polymer "A" exhibits a first refractive index (e.g., 1.88) in the direction of drawing and a second refractive index (e.g., 1.64) in the transverse direction.

In the polymeric multi-layer film refractive index related to the in-plane axis (in parallel with the surface of the film) is defined to be an effective refractive index relative to the plane-polarized incident light, and the polarizing plane is in parallel with the in-plane axis. Therefore, after being drawn, the multi-layer film - - - A B A B - - - exhibits a large difference in the inter-layer refractive index (1.88 to 1.64) in. the direction of drawing, but exhibits substantially the same inter-layer refractive index in the transverse direction. Accordingly, the multi-layer film can work as a reflection-type polarizing film capable of propagating polarized components of incident light. Here, the. above mentioned Y-axis is defined as propagation axis (or transmission axis), and light transmitting through the reflection-type polarizing film has a first polarizing orientation (or direction of polarization).

On the other hand, light that has not transmitted through the reflection-type polarizing film is polarized light exhibiting a second orientation which intersects the first polarizing orientation at right angles. Light exhibiting such a polarizing orientation is incident on the plane of the film along the X-axis and is reflected by the action of difference in the interlayer refractive index. Therefore, the X-axis is defined to be a reflection axis. In such a state, the reflection-type polarizing film permits the transmission of only light having a selected polarizing orientation (or direction of polarization).

Optical properties (reflection property and transmission property) of the reflection-type polarizing film vary, usually, depending upon the optical thicknesses of various polymer layers constituting the reflection-type polarizing film. If these polymer layers have optical thicknesses corresponding to a plurality of wavelengths of light or, in other words, represented by such wavelengths, then, the optical properties specifically and effectively respond in the band (wavelength band). If these layers have optical thicknesses smaller than the wavelengths of light, then, the structural interference can be utilized for improving the optical performance of the reflection-type polarizing film in the selected wavelengths.

A uniform layer having an optical thickness smaller than the wavelength of light of a visible spectrum can be formed by methods described in the working examples appearing later. When the thickness of the pair of layers "A" and "B" is greater than one-half the wavelength of incident light $(A+B>\lambda'/2)$, structural interference takes place. Depending upon the half-wavelength condition, there takes place structural interference of a narrow band at a predetermined wavelength. Optical performance of a wide band can be obtained by laminating or bonding a plurality of polymer layers of narrow bands. For instance, a first group of polymer layers having an equal thickness $(A+B=\lambda/2)$ can be laminated on a second group of polymer layers having a dissimilar thickness $(A+B=\lambda'/2)$ Usually, several hundreds of polymer layers (- - - A B A B - - -) can be laminated or bonded integrally together to obtain an effective response over a wide band. It is desired that the reflection-type polarizing film is designed to reflect light at any desired angle of incidence and at any wavelength.

Usually, the reflection factor of the reflection-type polarizing film is preferably less than 20%, more preferably, less than 10% and, most preferably, less than 5%, with respect to light linearly polarized in a direction in parallel with the Y-axis. The reflection factor is an average value for a desired zone of wavelengths and for a desired zone of angles of incidence for particular or general use. The reflection factor of the reflection-type polarizing film for linearly polarized light along the X-axis should preferably be not smaller than 30% and, more preferably, not smaller than 60% at a desired maximum angle of incidence.

The reflection-type polarizing film can be obtained by preparing a web containing the above-mentioned polymer layers alternatingly laminated like - - - A B A B - - - according to a customary method of preparing a multi-layer-film followed by drawing. As required, furthermore, a third polymer, a fourth polymer, and subsequent polymers may be used in addition to the first polymer "A" and the second polymer "B", thereby to form a polarizing film containing these polymer layers. When three or more kinds of polymers are to be used in combination, the order of laminating the polymer layers can be variously changed depending upon the desired effect.

Though not necessarily limited to those described below, typical examples of the polymer material that can be suitably used for forming the reflection-type polarizing film include isomers of polyethylene naphthalate (PEN) such as 2,6-, 1,4-, 1,5-, 2,7- and 2,3-PENs; polyalkylene terephthalates such as polyethylene terephthalate, polybutylene terephthalate, poly-1,4cyclohexanedimethylene terephthalate; polyimides such as polyacrylimides, polyetherimides; polystyrenes such as atactic polystyrene; polycarbonates; polymethacrylates such as polyisobutyl methacrylate, polypropyl methacrylate, polyethyl methacrylate and polymethyl methacrylate; polyacrylates such as polybutyl acrylate and polymethyl acrylate; cellulose derivatives such as ethyl cellulose, cellulose acetate, cellulose propionate, cellulose acetate butylate and cellulose nitrate; polyalkylene polymers such as polyethylene propylene, polybutylene, polyisobutylene, poly(4-methylpentene); fluorinated polymers such as perfluoroalkoxy resin, polytetrafluoroethylene, fluorinated ethylene/propylene copolymer, polyvinylidene fluoride, polychlorotrifluoroethylene; chlorinated polymers such as polyvinylidene chloride, polyvinyl chloride; polysulfones; polyethersulfones; polyacrylonitrile; polyamides; silicone resin; epoxy resin; polyvinyl acetate; polyether amides; ionomer resin; elastomers such as polybutadiene, polyisoprene, neoprene; polyurethanes; and the like.

Furthermore, as the polymer material, a copolymer can be similarly and advantageously used instead of the above-mentioned polymers or in combination therewith. The copolymer that can be used herein may be a two-component copolymer, a three-component copolymer or any other copolymer. Preferred examples of the copolymer include:

(1) a copolymer of polyethylene naphthalate (PEN) such as a copolymerized polyester (so-called copolyester) synthesized, for example, from a 2,6-, 1,4-, 1,5-, 2,7- and/or 2,3 naphthalenedicarboxylic acid or an ester of any one thereof;

two or more acids selected from the group consisting of (a) terephthalic acid or esters.thereof, (b) isophthalic acid or esters thereof, (c) phthalic-acid or esters thereof, (d) alkanedicarboxylic acid, and (e) cycloalkanedicarboxylic acid (such as cyclohexanedicarboxylic acid); and one or two or more glycols selected from the group consisting of alkane glycols and/or cycloalkane glycols (e.g., cyclohexanedimethanol diol);

(2) a copolymer of polyalkylene terephthalate such as a copolymerized polyester synthesized, for example, from two or more acids selected from the group consisting of (a) terephthalic acid or esters thereof, (b) isophthalic acid or esters thereof, (c) phthalic acid or esters thereof, (d) alkanedicarboxylic acid, and (e) cycloalkanedicarboxylic acid (such as cyclohexanedicarboxylic acid); and one or two or more glycols selected from the group consisting of alkane glycols and/or cycloalkane glycols (such as cyclohexanedimethanol diol); and (3) a copolymer of styrene, such as styrene/butadiene copolymer, styrene/acrylonitrile copolymer, etc.

In the reflection-type polarizing film, the polymer layers constituting the polarizing film may contain the above-mentioned polymer or copolymer solely, or may contain two or more kinds of the polymers and/or copolymers in any combination as a blend.

The polymer layers constituting the polarizing. film have thicknesses that can be widely changed depending upon the desired polarizing effect but usually from about 0.01 to 0.70 $\mu$m. When such polymer layers are laminated in many number to form a polarizing film, the polymer layers are laminated in a number as small as possible to heighten the transmission of light and to obtain desired optical characteristics. The number of the polymer layers laminated in the polarizing film is usually less than 5,000, preferably, less than 1,000 and, more preferably, from 100 to 500.

Moreover, the thickness of the polarizing film can be widely changed depending upon the desired polarizing effect and the number of the polymer layers that are laminated, but is usually from about 0.5 $\mu$m to 0.5 mm.

Furthermore, the polymeric multi-layer polarizer of the present invention may contain additives such as ultraviolet rayabsorbing agent, anti-oxidizing agent, anti-molding agent, antirusting agent, moisture-absorbing agent, coloring material, phosphorescent material, surfactant and the like to such a degree that they do not impair the effect of the invention.

Furthermore, a light-transmitting protection film may be formed on the front surface, on the back surface or on both surfaces of the polarizer so far as it does not impair the effect of the present invention.

In the-polymeric multi-layer polarizer, the individual layers are made of a polymeric material having birefringence. Therefore, a linearly polarized light having a particularly polarized direction may be allowed to pass through thereby to reflect the linearly polarized light that intersects therewith at right angles. Since the polymeric material does not almost absorb light, loss is very small for the linearly polarized light that transmits therethrough.

According to a preferred embodiment of the present invention, the Faraday rotator to be sandwiched by the first and second polarizers is made up of a 45 degree Faraday rotator capable of rotating the polarizing plane by 45 degrees in this case, a tapered glass plate is simultaneously used between the Faraday rotator and the second polarizer. The 451 Faraday rotator may have a constitution which is generally employed in this field of art and is formed of a thick film of, for example, Bi-substituted rare earth Fe garnet, such as GdBiFe garnet. The tapered glass plate is usually formed of a glass having a refractive index of from about 1.45 to 1.65, such as borosilicate glass. The tapered degree may vary depending upon the optical system in which the optical isolator is used and the desired effect, but is usually from 0.2 to 3 degrees.

In another preferred embodiment of the present invention, the Faraday rotator is made up of a tapered Faraday rotator. The tapered Faraday rotator may have a constitution which is generally employed in this field of art and is formed of a thick film of, for example, Bi-substituted rare earth Fe garnet, such as GdBiFe garnet. The tapered degree of the tapered Faraday rotator may vary depending upon the optical system in which the optical isolator is used and the desired effect, but is usually from about 0.2 to 3 degrees.

In another preferable embodiment of the present invention, the total constituent elements of first and second reflection-type polarizers and the Faraday rotator sandwiched between the two polarizers is tilted by a predetermined angle such as about 0.2 to 3 degrees, preferably about 0.2 to 5 degrees, if needed, by using other structure, instead of a tapered structure like the tapered glass plate or the tapered Faraday rotator. Then this embodiment can obtain substantially the same desired effect as the previously mentioned embodiment. The structure to be used to tilt the total constituent elements may be any structures by which a predetermined tilting angle can be stably obtained. The preferable structure used to tilt it is a compact one.

In the optical isolator of the present invention, it is desired that-the constituent elements such as Faraday rotator and polarizers are secured integrally together and, particularly, joined. together with an adhesive. Though there is no particular limitation, the adhesive used here should advantageously be the one having high degree of transparency and excellent adhering force. The light transmission factor of the adhesive used herein is usually not lower than 70%, preferably, not lower than 80% and, more preferably, not lower than 85%.

As such highly transparent adhesive, an acrylic adhesive is preferably used having a high degree of transparency and a large adhering force. The acrylic adhesive is a polymer obtained from a reaction material containing an acrylate monomer having an alkyl group with 4 to 14 carbon atoms, such as isooctyl acrylate, butyl acrylate or 2-ethylhexyl acrylate, and a (meth)acrylate monomer having a polar group, such as (meth)acrylic acid, carboxylalkyl (meth) acrylate, hydroxylalkyl (meth)acrylate or N,N-dialkyl acrylamide, or a composition containing such a polymer. As is widely known, "(meth)acrylic acid" is a term which encompasses acrylic acid and methacrylic acid, and (meth) acrylate and the like are used accordingly.

To adhere the elements by using an acrylic adhesive or any other adhesive, the adhesive is applied to the surface of the one element to form a layer of the adhesive, and this element with the adhesive layer is press-adhered to another element. The adhesive layer has a thickness of, usually, from 5 to 100 $\mu$m and, preferably, from 10 to 50 $\mu$m. The adhesive layer is formed by, for example, applying a coating solution containing the above mentioned polymer or polymer composition onto the element. The polymerization may be carried out on the element after the coating solution containing the above-mentioned reaction material is applied thereon. Or, a film-like adhesive formed on a separate peeling film may be transferred onto the element from the peeling film. The adhesive layer may contain the above mentioned various additives so far as the transparency is not impaired.

In the optical isolator of the present invention, two polymeric polarizers having a direction of polarization of transmitted light of 45 degrees with respect to the linearly polarized light are arranged in front of, and at the back of, the Faraday rotator to obtain a large loss in the reverse direction. That is, the loss of the thus constituted optical isolator in the reverse direction varies depending upon the light-extinguishing ratio of the polarizers, dependency of Faraday rotational angle upon the wavelength of light and upon the temperature. However, the polymeric polarizer used in the present invention reflects light that has not transmitted and guides the reflected light out of the optical system, making it possible to obtain a large loss in the reverse direction.

Working examples of the present invention will now be described in detail with reference to the accompanying drawings. Here, however, it should be noted that the present invention is in no way limited to the following examples only.

Example 1

FIG. 1 is a sectional view illustrating an optical isolator according to the first example of the present invention. In the diagramed optical isolator 10, a first polarizer 1 and a second polarizer-2 are those of the reflection type composed of the above-mentioned polymeric multi-layer film, and have been so set that the directions of polarization of light that has transmitted through the polarizing plates define an angle of 45 degrees relative to each other. The polarizing plates have a thickness of about 0.1 mm, respectively. Between these two pieces of polarizing plates are arranged a 45 degree Faraday rotator 3 made of a thick film of GdBiFe garnet and a tapered glass plate 4 in a manner as shown. To the 45 degree Faraday rotator 3 is applied a magnetic field H along a direction in which light travels. The tapered glass plate 4 has a refractive index of 1.55 and a tapered angle of 2 degrees. Furthermore, though not shown, the elements are joined and secured together with an acrylic adhesive (isooctyl acrylate/acrylic acid copolymer, light transmission factor of about 98%).

Figure 2:
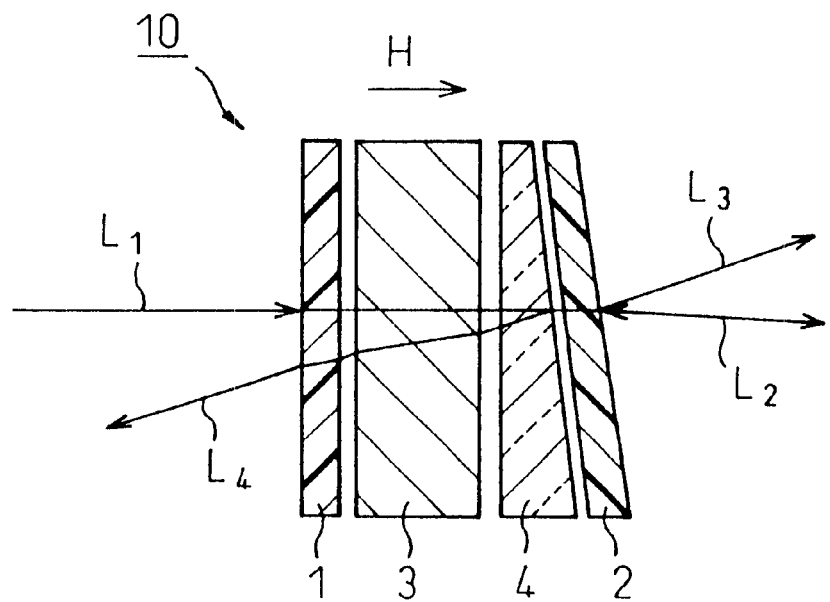
FIG. 2 is a sectional view illustrating the paths of transmission light through the optical isolator of FIG. 1.

The principle of operation of the shown optical isolator 10 will be described below with reference to a sectional view of FIG. 2 which illustrates the optical paths of the optical isolator in the forward direction and in the reverse direction. First, light L, incident on the optical isolator 10 from the forward direction passes through the first polarizer 1, 45 degree Faraday rotator 3, tapered glass plate 4, and second polarizer 2, successively, and goes out in the direction of optical path L2'. Here, light is refracted to some extent depending upon the ratio of a refractive index of the adhesive joining the elements and a refractive index of the air surrounding the optical isolator 10.

On the other hand, a polarized light component of light $L_2$ incident on the optical isolator 10 from the reverse. direction (from the-right side in FIG. 2) is reflected in the direction of optical path $L_3$ by the second polarizer 2. The polarized light component that is not reflected but has transmitted through the second polarizer 2, passes through the tapered glass plate 4 and, 45 degree Faraday rotator 3, successively, and falls on the first polarizer 1. Here, the direction of polarization of the polarizer 1 has been turned by 90 degrees from the direction of transmission of the polarizer. Therefore, light incident on the polarizer 1 is reflected again, passes through the Faraday rotator 3 and tapered glass plate 4, and arrives at the polarizer 2. In the polarizer 2, the direction of polarization of the incident light has been turned by 90 degrees from the direction of transmission of the polarizer 2, and, hence, the incident light is reflected. Next, the reflected light passes through the tapered glass plate 4 and Faraday rotator 3, and falls on the polarizer 1. Here, however, the direction of the reflected light is in agreement with the direction of transmission of the polarizer 1. Therefore, light transmits in the direction of optical path $L_4$. When compared with the direction $L_1$ of incidence of light from the forward direction, the traveling direction $L_4$ of light is tilted by an angle nearly equal to the product of twice the tapered angle of the tapered glass plate 4 and the refractive index of the adhesive. That is, in the optical system in which the diagramed optical isolator 10 is disposed, the incident light from the reverse direction is never coupled to the optical path of incident light from the forward direction.

Figure 3:
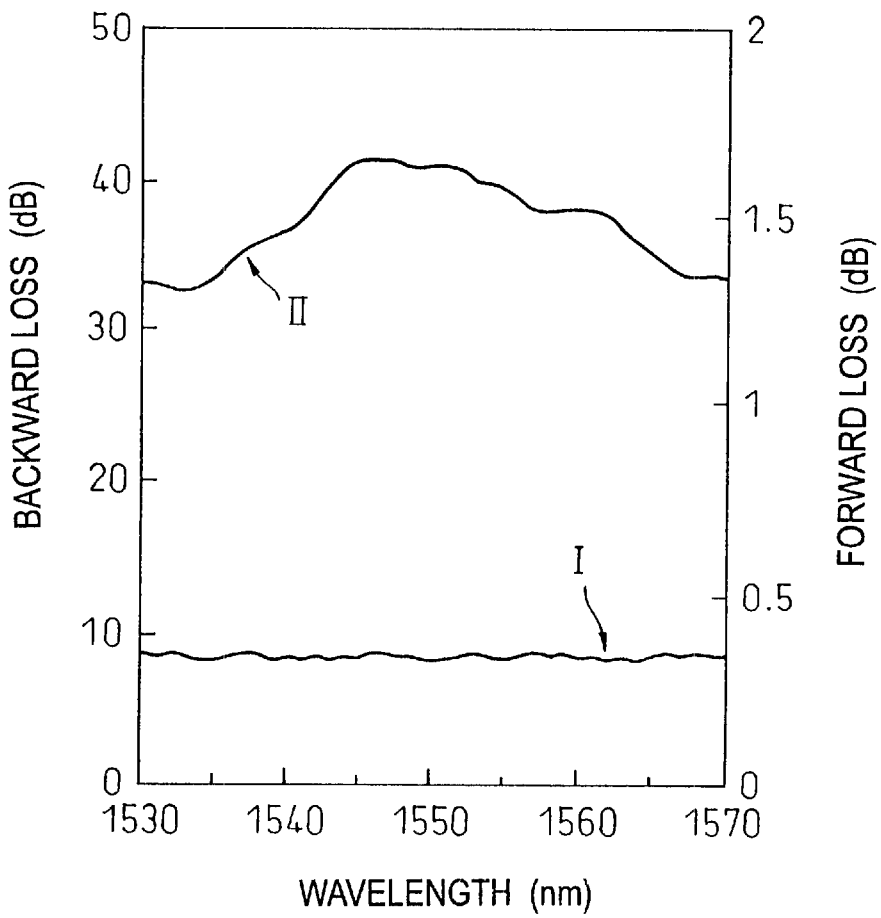
FIG. 3 is a graph illustrating the optical characteristics of the optical isolator of FIG. 1.

FIG. 3 is a graph illustrating the above-mentioned behaviour. In this graph have been plotted optical characteristics of when the optical isolator 10 of FIG. 1 is arranged in the optical system of parallel light beam, and wherein a curve I represents loss of light in the forward direction and a curve II represents loss of light in the backward direction. When the wavelength is, for example, 1,550 nm, the loss in the forward direction is about 0.34 dB and the loss in the backward direction is about 41 dB. This result indicates that the diagramed optical isolator 10 makes it possible to accomplish a markedly large loss in the reverse direction owing to its constitution.

When compared with the conventional optical isolator, the optical isolator 10 of FIG. 1 can be easily produced through a very simple process of production maintaining good yield of products. That is, since the individual constituent elements are stuck with an adhesive and are secured together, a number of optical isolators can be correctly produced at one time contributing greatly to decreasing the cost of production and increasing the yield. For example, when the Faraday rotator, tapered glass plate and two pieces of polarizing plates of a square shape having a side measuring 11 mm are adhered and are, then, cut, there can be obtained-a total of 25 optical isolators (each having a square shape with its side measuring 1.7 mm).

Example 2

Figure 4:
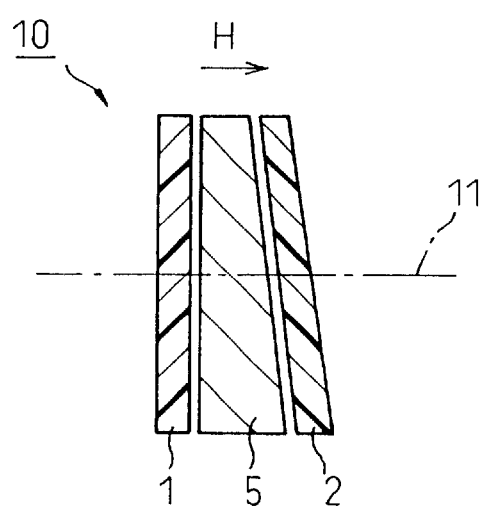
FIG. 4 is a sectional view illustrating the optical isolator according to a second embodiment of the present invention.

FIG. 4 is a sectional view illustrating the optical isolator according to the second example of the present invention. In the diagramed optical isolator 10, the first polarizer 1 and the second polarizer 2 are reflection-type polarizing plates made of the polymeric multi-layer film same as the one used in the above-mentioned Example 1, which are so set that the directions of polarization of light that has transmitted through the polarizing plates define an angle of 45 degrees relative to each other. Between these two polarizers is sandwiched a tapered Faraday rotator 5 made of a thick film of GdBiFe garnet in a manner as shown. To the Faraday rotator 5 is applied a magnetic field H along the direction in which light travels. The tapered angle of the Faraday rotator 5 is 2 degrees. Though not shown, the individual elements are joined and secured together with an acrylic adhesive (isooctyl acrylate/acrylic acid copolymer, light transmission factor of about 98%). Furthermore, non-reflection coating has been applied to the surfaces of the first polarizer 1 and of the second polarizer 2 that are exposed to the air. A non-reflection coating for the adhesive has also been applied to both surfaces of the Faraday rotator 5.

In the illustrated optical isolator 10, the Faraday rotator 5 is tapered. Accordingly, Faraday rotational angle can be varied depending upon the distance from the center axis 11 of the optical isolator 10 for the transmitted tight. in the optical system in which the optical isolator is disposed, however, the required tapered angle is usually from about 1 to about 2 degrees. With-the tapered angle of this degree, a thick film of Bi-substituted rare earth Fe garnet in which the Faraday rotator has an average thickness of about 0.4 mm, makes it possible to obtain a large loss of not smaller than 25 dB in the reverse direction when the diameter of light beam is 1 mm.

In the optical isolator of the type shown, when a thick film of Bi-substituted rare earth Fe garnet that does not require an external magnetic field is used as a Faraday rotator, there is realized a small optical isolator since the polarizer has a thickness of about 0.1 mm. Besides, the optical isolators can be produced at one time and at a low cost.

When the 45 degree Faraday rotator has a thickness of not smaller than 1.5 mm, furthermore, a change in the Faraday rotational angle in the light transmission plane can be neglected in, for example, the Bi-substituted rare earth garnet thick film in which priority is given to the wavelength dependency and in the CdMnMgTeSe crystal, and an improved isolation is accomplished.

FIG. 5 is a sectional view illustrating an optical isolator according to the third example of the present invention. In the diagramed optical isolator 10, a first polarizer 1 and a second polarizer 2 are those of the reflection type composed of the above-mentioned polymeric multi-layer film, and have been so set that the direction of polarization of light that has transmitted through the polarizing plates define an angle of 45 degrees relative to each other. The polarizing plates have a thickness of about 0.1 mm, respectively. Also, the each polarizing plate adhered with a thin glass plate having a thickness of about 0.3 m can be used, wherein the glass plate is adhered so that the glass plate looks outside. Between these two pieces of polarizing plates, a 45 degree Faraday rotator 3 made of thick film of GdBiFe garnet are arranged in a manner as shown in FIG. 5. And a magnetic field H is applied to the 45 degree Faraday rotator 3 along a direction in which light travels. Furthermore, although not shown, the each element is combined and fixed together with an acrylic adhesive (isooetyl acrylate/acrylic acid copolymer, light transmission factor of about 98l/.). And although not shown, the optical isolator 10 is set with an angle from 3 to 4 degrees against a direction in which light travels by using other structure.

The principle of operation of the shown optical isolator 10 is described below with reference to a sectional views of FIGS. 5 and 6, which illustrates the optical paths at the optical isolator in the forward direction and in the reverse direction. First, incident light L1 on the optical isolator 10 from the forward direction passes through the first polarizer 1, 45 degree Faraday rotator 3, and second polarizer 2, successively, and goes out in the direction of opticalpaths L2. Here, light is refracted to small extent depending upon the ratio of refractive index of the adhesive combining the elements and a refractive index of the air surrounding the optical isolator 10.

As seen in FIG. 6 on the other hand, only 45 degrees polarized light component of incident light L2 on the optical isolator 10 from the reverse direction is incident onto the polarizer 2. Other light is reflected in the direction of optical paths L3 by the second polarizer 2. The polarized light component that has incidented and transmitted through the second polarizer 2, passes through 45 degrees Faraday rotator 3, successively, and rotates by 45 degrees in the same direction as incident light L2. Here, the direction of polarized light has been turned by 90 degrees against the polarizer 1. Therefore, the polarized light is reflected by the polarizer 1. The light reflected by the polarizer 1 rotates by 45 degrees in the Faraday rotator, and reaches the polarizer 3. But the light is polarized by 90 degrees against the polarizer 3, reflects again on the polarizer 3, and rotates by 45 degrees. When the light reaches to the polarizer 1, the polarizing direction becomes the same as the polarizer 1, and transmits through the polarizer 1 toward the LI side.

However the light goes on as shown. in FIG. 6, and incidents at the different position from the axis of the original light, because the optical isolator is tilted. Therefore the backward light does not incident into the light source.

According to the present, invention, as will be appreciated from the above descriptions, in the, optical isolator in which the Faraday rotator is sandwiched by two polarizers as described above, the polarizers that are used feature large areas without requiring such work as polishing. Besides, use of such polarizers makes, it possible to mass-produce optical isolators through easy and simple manufacturing process while reducing the cost of production.

What is claimed is:

1. An optical isolator comprising the following constituent elements in the described order:
   a first reflection-type polarizer made of a polymeric multi-layer film;
   a Faraday rotator;
   a glass plate; and
   a second reflection-type polarizer made of a polymeric multi-layer film.

2. An optical isolator according to claim 1, wherein said glass plate is tapered.

3. The optical isolator according to claim 1, wherein said Faraday rotator is capable of rotating a polarizing plane by 45 degrees.

4. An optical isolator of claim 1, wherein said constituent elements are joined together with an adhesive.

* * * * *